US007046626B2

(12) United States Patent
Davis et al.

(10) Patent No.: US 7,046,626 B2
(45) Date of Patent: May 16, 2006

(54) SWITCHING DEVICES

(75) Inventors: Simon Paul Davis, Romsey (GB); Andrew Reeve, Winchester (GB)

(73) Assignee: Roke Manor Research Limited, Romsey (GB)

(*) Notice: Subject to any disclaimer, the term of this patent is extended or adjusted under 35 U.S.C. 154(b) by 762 days.

(21) Appl. No.: 09/898,484

(22) Filed: Jul. 5, 2001

(65) Prior Publication Data
US 2002/0021667 A1 Feb. 21, 2002

(30) Foreign Application Priority Data

| Jul. 5, 2000 | (GB) | 0016475.6 |
|---|---|---|
| Oct. 10, 2000 | (GB) | 0024736.1 |

(51) Int. Cl.
*H04L 12/54* (2006.01)
(52) U.S. Cl. .................. 370/230; 370/359; 370/413
(58) Field of Classification Search ............. 370/351, 370/359–363, 389, 392, 412–414, 419, 422, 370/428, 230–232, 355–357, 395.4, 395.42
See application file for complete search history.

(56) References Cited

U.S. PATENT DOCUMENTS

| 5,500,858 A |   | 3/1996  | McKeown ............. 370/412 |
| 5,517,495 A |   | 5/1996  | Lund et al. ............ 370/399 |
| 5,748,629 A |   | 5/1998  | Caldara et al. ........ 370/389 |
| 5,862,136 A | * | 1/1999  | Irwin ................. 370/395.4 |
| 5,982,771 A |   | 11/1999 | Caldara et al. ........ 370/389 |

(Continued)

FOREIGN PATENT DOCUMENTS

EP  1 009 189 A2  6/1999

(Continued)

OTHER PUBLICATIONS

British Search Report.

*Primary Examiner*—John Pezzlo
*Assistant Examiner*—Saba Tsegaye
(74) *Attorney, Agent, or Firm*—Crowell & Moring LLP

(57) ABSTRACT

The invention relates to a switching device (300) having a plurality of line interface cards (LICs) (310), a plurality of egress LICs (320), a cross-bar (330) and a management card (340). The switching device (300) routes fixed sized cells of data across the cross-bar (330). The cells comprise fragments of variable length data packets. Each ingress LIC (312, 314, 316) is associated with a respective schedule or timetable (362, 364, 366) governing the transmission of cells by the ingress LIC. Similarly, each egress LIC (322, 324, 326) is also associated with a respective schedule or timetable (382, 384, 386) governing the reception of cells by said egress LIC. The schedules are in the form of a table whose entries are the identities of transmission queues corresponding to a respective egress LIC identification number (for ingress LICs) and ingress LICs from which to receive (egress LICs). Each ingress and egress LIC maintains a pointer into its associated schedule. At each cell transmit time, each ingress LIC transmits a cell from the queue identified by the pointer and each egress LIC will receive the cell from the ingress LIC identified in the entry referenced by the pointer. The pointers then move to the next location. Each schedule is circular in the sense that when moving the pointer from the last entry, its next position is the first entry.

17 Claims, 3 Drawing Sheets

U.S. PATENT DOCUMENTS

| | | | |
|---|---|---|---|
| 6,611,527 B1 * | 8/2003 | Moriwaki et al. | 370/412 |
| 6,647,019 B1 * | 11/2003 | McKeown et al. | 370/422 |
| 6,654,343 B1 * | 11/2003 | Brandis et al. | 370/229 |
| 6,680,933 B1 * | 1/2004 | Cheesman et al. | 370/352 |
| 6,704,312 B1 * | 3/2004 | Chang et al. | 370/389 |
| 6,721,271 B1 * | 4/2004 | Beshai et al. | 370/232 |
| 6,735,212 B1 * | 5/2004 | Calamvokis | 370/412 |
| 6,856,622 B1 * | 2/2005 | Calamvokis et al. | 370/390 |
| 6,865,154 B1 * | 3/2005 | Charny et al. | 370/235 |

FOREIGN PATENT DOCUMENTS

| | | |
|---|---|---|
| WO | WO 99/35792 | 7/1999 |
| WO | WO 99 35879 | 7/1999 |
| WO | WO 00 10281 | 2/2000 |
| WO | WO 00/28684 | 5/2000 |
| WO | WO 00/64109 | 10/2000 |

\* cited by examiner

SWITCHING DEVICES

BACKGROUND OF THE INVENTION

The present invention relates to improvements in or relating to switching devices, and is more particularly concerned with a system for providing distributed schedules for such a device. In particular, the invention relates to the distribution of control between a management card and line interface cards (LICs) on a switching device. For the purposes of the following description the term switching device refers to any device which performs the function of a circuit switch, packet switch or a router.

Data is transferred over the Internet by means of a plurality of routing devices in accordance with a standard protocol known as Internet Protocol (IP). IP is a protocol based on the transfer of data in variable sized portions known as packets. All network traffic involves the transportation of packets of data. Routers are devices for accepting incoming packets; temporarily storing each packet; and then forwarding the packets to another part of the network.

Traffic volume in the Internet is growing exponentially, almost doubling every 3 months, and the capacity of conventional IP routers is insufficient to meet this demand. There is thus an urgent requirement for products that can route IP traffic at extremely large aggregate bandwidths in the order of several terabits per second. Such routing devices are termed "terabit routers".

Terabit routers require a scalable high capacity communications path between the point at which packets arrive at the router (the "ingress") and the point at which the packets leave the router (the "egress").

The packets transferred in accordance with IP can (and do) vary in size. Within routers it has been found useful to pass data in fixed sized units. In routers, the data packets are partitioned into small fixed sized units, known as cells.

One suitable technique for implementing a scalable communications path is a backplane device, known as a cell based cross-bar. Data packets are partitioned into cells by a plurality of ingress means for passage across the cross-bar.

The plurality of ingress means provide respective interfaces between incoming communications channels carrying incoming data and the backplane device. Similarly a plurality of egress means provide respective interfaces between the backplane device and outgoing communications channels carrying outgoing data.

A general terabit router architecture bears some similarity to conventional router architecture. Packets of data arrive at input port(s) of ingress means and are routed as cells across the cross-bar to a predetermined egress means which reassembles the packets and transmits them across its output port(s). Each ingress means maintains a separate packet queue for each egress means.

The ingress and egress means may be implemented as line interface cards (LICs). Since one of the functions regularly undertaken by the ingress and egress means is forwarding, LICs may also be known as 'forwarders'. Further functions include congestion control and maintenance of external interfaces, input ports and output ports.

In a conventional cell based cross-bar each ingress means is connected to one or more of the egress means. However, each ingress means is only capable of connecting to one egress means at any one time. Likewise, each egress means is only capable of connecting to one ingress means at a time.

All ingress means transmit in parallel and independently across the cross-bar. Furthermore cell transmission is synchronised with a cell cycle, having a period of, for example, 108.8 ns.

The ingress means simultaneously each transmit a new cell with each new cell cycle.

The pattern of transmissions from the ingress means across the cross-bar to the egress means changes at the end of every cell cycle.

The co-ordination of the transmission and reception of cells is performed by a cross-bar controller.

A cross-bar controller is provided for efficient allocation of the bandwidth across the cross-bar. It calculates the rates that each ingress means must transmit to each egress means. This is the same as the rate at which data must be transmitted from each packet queue. The calculation makes use of real-time information, including traffic measurements and indications from the ingress means. The indications from the ingress means include monitoring the current rates, queue lengths and buffer full flags. The details of the calculation are discussed in the copending UK Patent Application Number 9907313.2.

The cross-bar controller performs a further task; it serves to schedule the transfer of data efficiently across the cross-bar whilst maintaining the calculated rates. At the end of each cell cycle, the cross-bar controller communicates with the ingress and egress means as follows. Firstly, the cross-bar controller calculates and transmits to each ingress means the identity of the next packet queue from which to transmit. Secondly, the cross-bar controller calculates and transmits to each egress means the identity of the ingress from which it must receive.

The system described above does have a number of disadvantages however. The cross-bar controller is responsible for controlling the cell cycle-by-cell cycle behaviour of each ingress and egress means. At the rates required by a terabit router, this amounts to demanding complex hardware to implement the cross-bar controller, the ingress and the egress means. Furthermore the demand for higher capacity places stringent delay performance conditions upon the communication channels between the ingress and egress means and the cross-bar controller means.

When developing a system for particular traffic conditions, it is disadvantageous to have to replace inappropriate hardware.

SUMMARY OF THE INVENTION

It is therefore an object of the invention to obviate or at least mitigate the aforementioned problems.

In accordance with one aspect of the present invention, there is provided a switching arrangement having:

a cross-bar;

a plurality of ingress means connected to an input side of the cross-bar, each ingress means including an ingress schedule storing means;

a plurality of egress means connected to an output side of the cross-bar, each egress means including an egress schedule storing means; and a management card which communicates configuration primitives to each of the plurality of ingress means and to each of the plurality of egress means, the configuration primitives providing updated entries for ingress and egress schedule storing means.

It is preferred that each ingress means includes means for storing a plurality of transmission queues for transmission across the cross-bar. Advantageously, each ingress schedule storing means stores identities of said transmission queues, each transmission queue corresponding to a respective egress means identification number.

Preferably, each ingress means maintains a pointer into each ingress schedule storing means for identifying the transmission queue to be transmitted.

It is also preferred that each egress schedule storing means stores identities of ingress means addresses from which data is to be received. Advantageously, each egress means maintains a pointer into each egress schedule storing means for identifying an ingress means address from which data is to be received.

In accordance with another aspect of the present invention, there is provided a method of routing data using a switching arrangement as described above, the method comprising:

a) storing a plurality of transmission queue identities in each ingress schedule storing means;

b) storing a plurality of ingress identities in each egress schedule storing means;

c) managing the contents of each ingress schedule storing means and each egress schedule storing means by providing ingress pointer means to reference one of said stored plurality of transmission queue identities and egress pointer means to reference one of said stored plurality of ingress identities from which data is to be received; and d) at each cell transmit time, transmitting a cell from said referenced transmission queue in the ingress means and receiving the cell from said referenced ingress identity.

Preferably, step d) further comprises moving said ingress pointer and said egress pointer to the next location.

It is preferred that step c) comprises, for each ingress means, calculating cross-bar rates required to each egress means. Said cross-bar rates may be calculated according to current traffic load and quality of service required.

Additionally, step c) further comprises calculating corresponding ingress and egress schedules which satisfy said calculated cross-bar rates. The method further comprises the step of updating the ingress and egress schedule storing means with update messages relating to the calculated ingress and egress schedules.

The present invention provides a routing device having a plurality of ingress line function means, a plurality of egress line function means, a backplane and a management card; each ingress line function means having: a schedule storing means, for storing a schedule of egress line function means addresses; a pointer storing means, for storing a pointer to an address held in the schedule storing means; and a queue storing means, for storing a plurality of ingress queues of cells for transmission across the backplane, each one of the plurality of ingress queues corresponding uniquely to a predetermined one of the egress line function means; wherein the management card communicates configuration primitives to each of the plurality of ingress line function means and to each of the plurality of egress line function means, the configuration primitives providing updated entries for the schedule.

The ingress line function means may be line interface cards. Likewise the egress line function means may also be line interface cards.

As a result of the present invention, simple schedules for cell transmission and reception across the cross-bar are sent to each LIC by the controller. The controller is responsible for formulating the schedules to ensure that traffic and quality of service requirements are met. The LICs merely have to obey the schedules, a simple task. The principle benefits are reduced complexity of the LICs, and flexibility.

New services can be added to the router by software download without impact on the LIC hardware.

Other objects, advantages and novel features of the present invention will become apparent from the following detailed description of the invention when considered in conjunction with the accompanying drawings.

DETAILED DESCRIPTION OF THE DRAWINGS

Although the present invention will be described with reference to ingress and egress forwarders, it will readily be understood that the present invention is not limited to the use of such forwarders. Any suitable line function means can be used for ingress and egress, for example, line interface cards (LICs).

Figure 1:
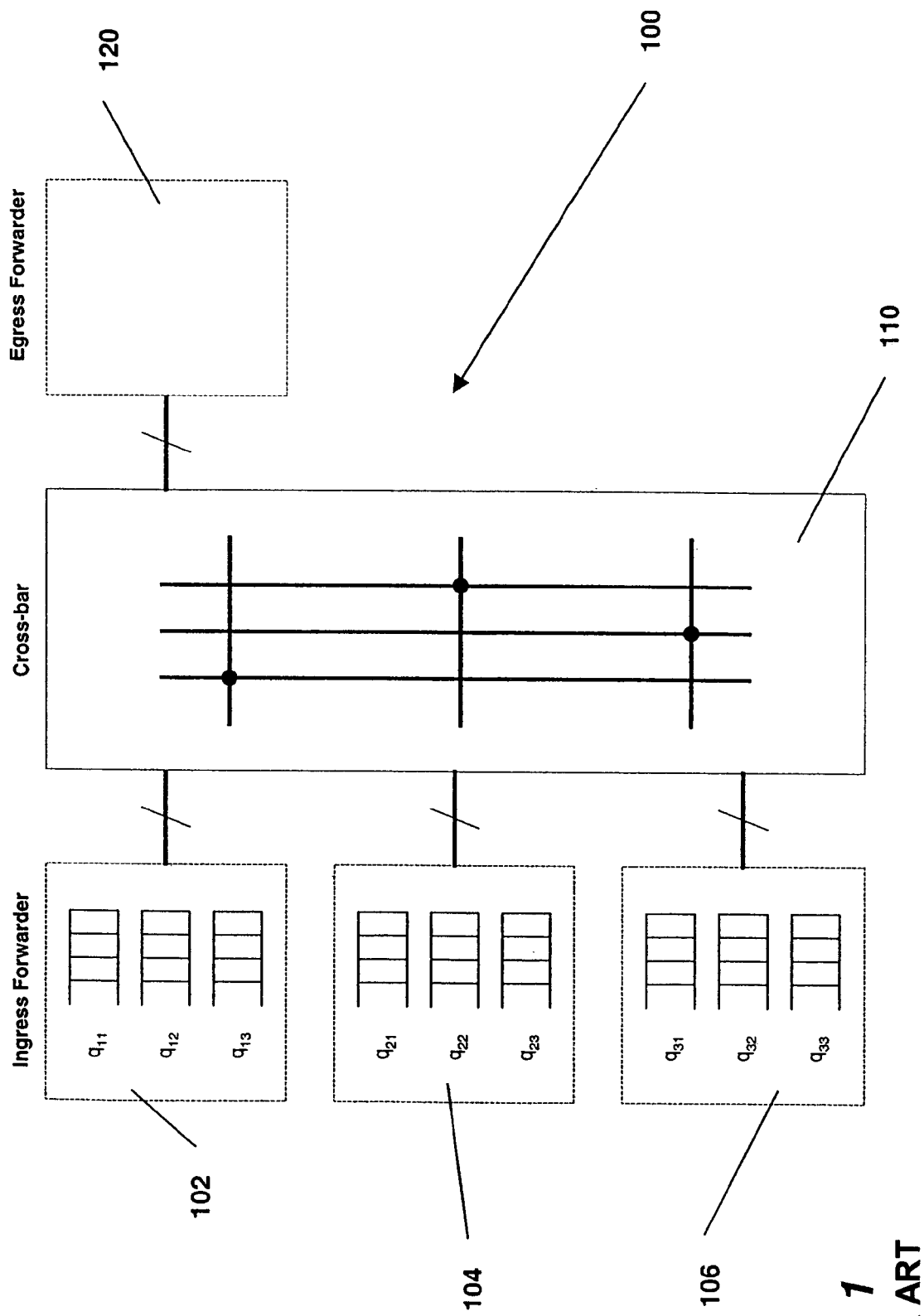
FIG. 1 illustrates a terabit router architecture.

FIG. 1 illustrates a conventional terabit router architecture 100 in which packets arrive at ingress forwarders 102, 104, 106 via their input port(s) (not shown) and are routed across a cross-bar 110 to a correct egress forwarder 120 which transmits them across its output port(s) (not shown). Each ingress forwarder 102, 104, 106 maintains a separate packet queue for each egress forwarder 120.

Ingress forwarder 102 has three queues $q_{11}$, $q_{12}$, $q_{13}$ of data packets ready for transfer to three separate egress forwarders, only one of which is shown as 120, via the cross-bar 110. Similarly, three queues $q_{21}$, $q_{22}$, $q_{23}$ and $q_{31}$, $q_{32}$, $q_{33}$ are formed respectively in each of the ingress forwarders 104, 106. Although three queues are shown in each ingress forwarder 102, it will be appreciated that any number of queues can be present in each ingress forwarder 102, 104, 106, each queue corresponding to an egress means.

It will be appreciated that although only one egress forwarder 120 is shown in FIG. 1, the number of egress forwarders will be the same as the number of ingress forwarders.

By way of explanation, a cell based cross-bar is characterised as follows:

a) Each ingress line function may be connected to any egress line functions.

b) Each ingress line function may only be connected to one egress line function at a time.

c) Each egress line function may only be connected to one ingress line function at a time.

d) All ingresses transmit in parallel across the cross-bar.

e) Data is transmitted across the cross-bar in small fixed sized cells, for example, a cell size is typically 64 octets.

f) Cell transmission is synchronised across all the ingress line functions. This means that for each cell cycle, each ingress line function starts transmitting the next cell at the same time.

g) The cross-bar is reconfigured at the end of every cell cycle.

As shown in FIG. 1, packets of data arriving at the ingress forwarders 102, 104, 106 via their input port(s) (not shown) and are routed across the cross-bar 110 to the correct egress forwarders 120 which transmits them across its output port(s) (also not shown). Each ingress forwarder 102, 104, 106 maintains a separate packet queue for each egress forwarder 120, for example, $q_{11}$, $q_{12}$, $q_{13}$, $q_{21}$, $q_{22}$, $q_{23}$, $q_{31}$, $q_{32}$, $q_{33}$.

Figure 2:
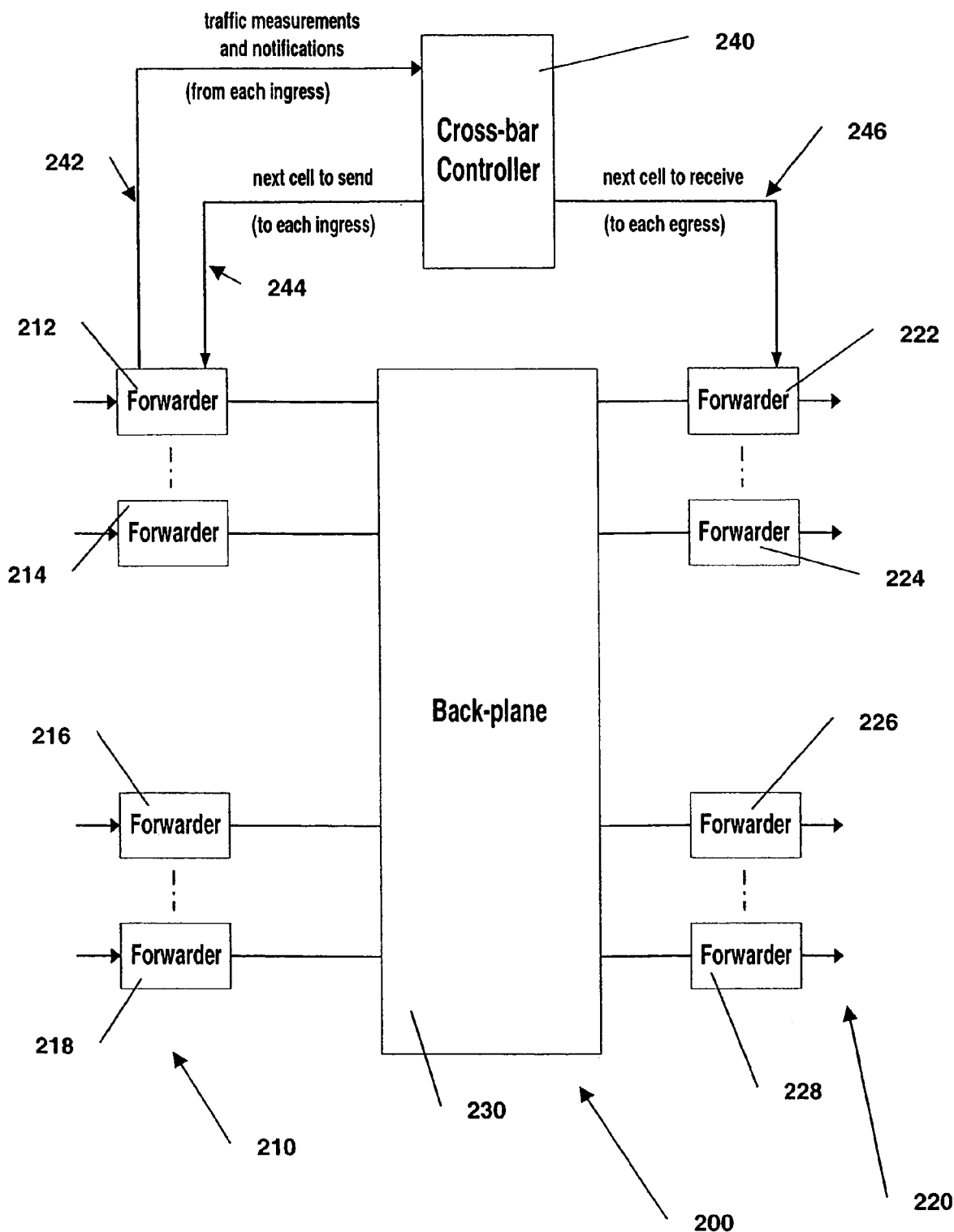
FIG. 2 shows a cross-bar controller.

A conventional cell based cross-bar arrangement 200 is shown in FIG. 2. The arrangement 200 comprises a plurality of ingress forwarders 210 and a plurality of egress forwarders 220 connected to a cross-bar or backplane 230. Here, each ingress forwarder 212, 214, 216, 218 may be connected to one or more of the egress forwarders 222, 224, 226, 228. However, as mentioned above, each ingress forwarder 212, 214, 216, 218 may only be connected to one egress forwarder 222, 224, 226, 228 at a time and each egress forwarder 222, 224, 226, 228 may only be connected to one ingress forwarder at a time 212, 214, 216, 218.

The cross-bar arrangement 200 is controlled by a cross-bar controller 240 which is connected to each ingress forwarder 212, 214, 216, 218 via links 242, 244 and to each egress forwarder 222, 224, 226, 228 via link 246. The cross-bar controller 240 co-ordinates the transmission and reception of cells via links 242, 244, 246.

Each ingress forwarder 212, 214, 216, 218 communicates traffic measurements and notifications for the use of the cross-bar controller 240. The cross-bar controller 240 allocates temporary connections between ingress forwarders 212, 214, 216, 218 and egress forwarders 222, 224, 226, 228 and informs the respective forwarders accordingly for each cell cycle in turn.

Figure 3:
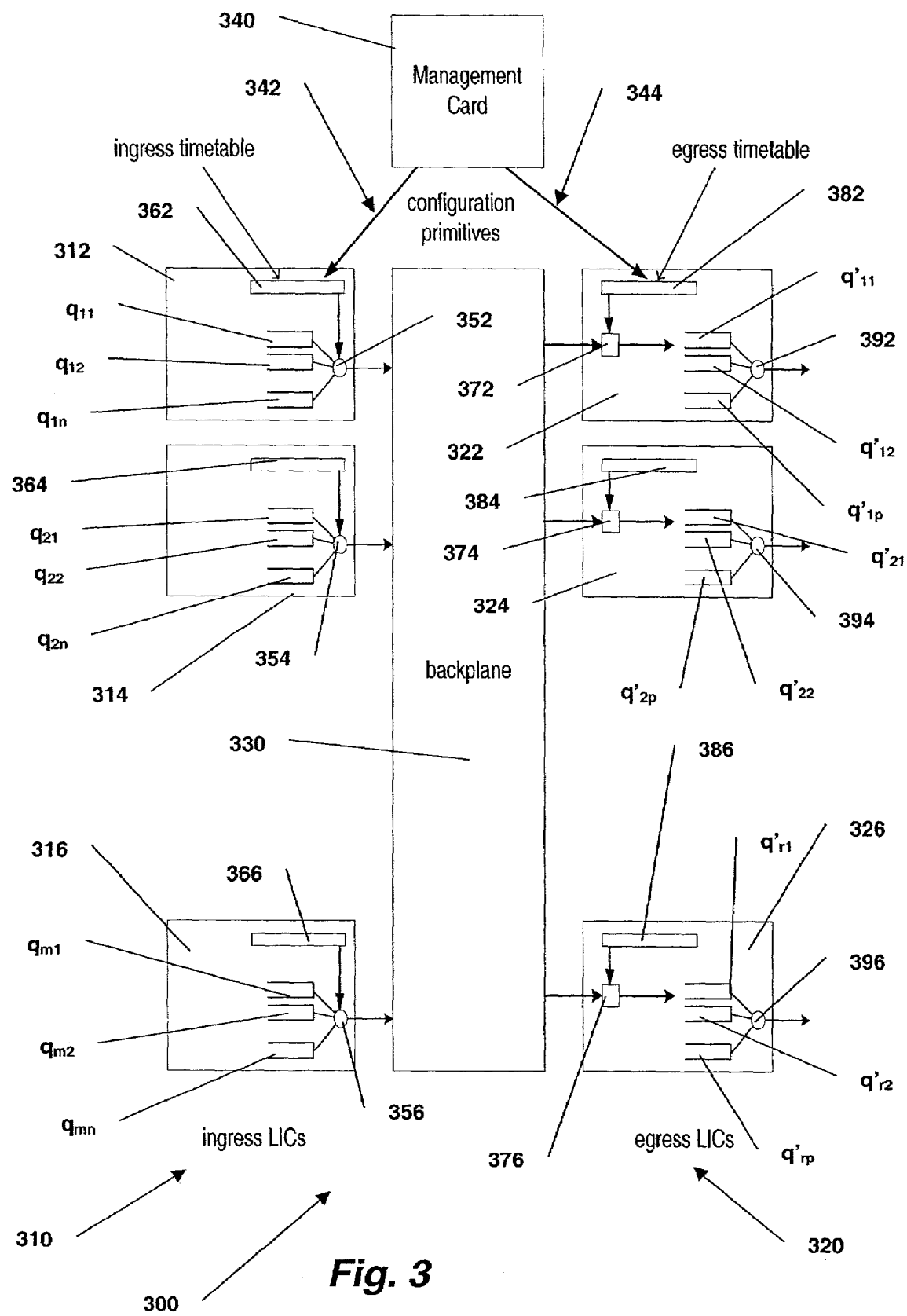
FIG. 3 shows a system for distributing schedules according to the present invention.

FIG. 3 illustrates a system 300 in accordance with the present invention. The system 300 includes a plurality of ingress forwarders 310, a plurality of egress forwarders 320, a cross-bar 330, and a management card 340 which includes cross-bar controller means (not shown). The ingress forwarders 312, 314, 316 and egress forwarders 322, 324, 326 are shown as line interface cards (LICs), but may be implemented in other ways.

Although three ingress and three egress forwarders are shown, it will readily be appreciated that any suitable number of ingress and egress forwarders may be utilised according to the particular application. In this arrangement, it is not essential that the number of ingress forwarders and egress forwarders are the same, for example, a multiplexer may have sixteen ingress forwarders and only four egress forwarders.

Each ingress forwarder 312, 314, 316 has a buffer (not shown in detail) containing a plurality of data queues $q_{11}$, $q_{12}$, ..., $q_{1n}$, $q_{21}$, $q_{22}$, ..., $q_{2n}$, and $q_{m1}$, $qm_2$, ..., $q_{mn}$, respectively (where m is the number of ingress forwarders 310 and n is the number of data queues) feeding into respective schedulers 352, 354, 356.

Each queue can be generally represented as $q_{jk}$ where j indicates the ingress, k indicates the egress, and $q_{jk}$ represents the packet queue at the ingress j for packets destined for egress k.

Each scheduler 352, 354, 356 is connected to a respective ingress timetable 362, 364, 366 which controls the selection of data queue to be transferred to the cross-bar 330 in accordance with data from the management card 340.

Similarly, each egress forwarder 322, 324, 326 has a respective ingress selector 372, 374, 376 for receiving data from the cross-bar 330 and for transferring it to a buffer (not shown in detail) containing a plurality of data queues $q'_{11}$, $q'_{12}$, ..., $q'_{1p}$, $q'_{21}$, $q'_{22}$, ..., $q'_{2p}$, and $q'_{r1}$, $q'_{r2}$, ..., $q'_{rp}$, respectively (where r is the number of egress forwarders 320 and p is the number of data queues). Each ingress selector 372, 374, 376 is connected to a respective egress timetable 382, 384, 386 which provides information as to which ingress forwarder to select in accordance with data from the management card 340. Each data queues $q'_{11}$, $q'_{12}$, ..., $q'_{1p}$, $q'_{21}$, $q'_{22}$, ..., $q'_{2p}$, and $q'_{r1}$, $q'_{r2}$, ..., $q'_{rp}$ is connected to a further scheduler 392, 394, 396 which selects the appropriate queue to be output. This is, however, not essential to the present invention.

The operation of the method according to the present invention will now be described using the system 300 shown in FIG. 3.

Each ingress LIC (ingress forwarder) 312, 314, 316 is associated with a respective schedule or timetable 362, 364, 366 governing the transmission of cells by said ingress LIC. The schedule is in the form of a table whose entries are the identities of ingress LICs. Each ingress LIC maintains a pointer into the schedule. At each cell transmit time, the LIC transmits a cell from the queue identified in the entry referenced by the pointer, and moves the pointer to the next location. The schedule is circular in the sense that when moving the pointer from the last entry, its next position is the first entry.

Each egress LIC (egress forwarder) 322, 324, 326 is also associated with a respective schedule or timetable 382, 384, 386 governing the reception of cells by said egress LIC. The schedule is in the form of a table whose entries are the identities of ingress LICs from which to receive. An egress LIC maintains a pointer into the schedule. At each cell transmit time, the LIC will receive the cell from the ingress identified in the entry referenced by the pointer, and moves the pointer to the next location. Again, the schedule is circular in the sense that when moving the pointer from the last entry, its next position is the first entry.

The management card 340 manages the contents of the ingress and egress schedules or timetables 362, 364, 366, 382, 384, 386. For each ingress LIC (ingress forwarder) 312, 314, 316, the management card 340 calculates the cross-bar rates required to each egress LIC (egress forwarder) 322, 324, 326. The cross-bar rates are calculated according to the current traffic load and required quality of service. The rates are calculated, for example, as described in the co-pending application mentioned above. Alternatively, the rates could be fixed.

Having calculated the rates, the management card 340 calculates corresponding ingress and egress schedules or timetables needed to satisfy them. It then updates the schedules or timetables using update messages known as configuration primitives on links 342, 344. Only modifications to the schedules need be transmitted rather than the complete tables. This reduces the control traffic from the management card.

On receipt of the configuration primitives, the LICs or forwarders update the schedules as requested.

In order to avoid problems associated with updating the schedule, that is, reading and writing to the same point in schedule, the schedule may be partitioned so that reading and writing occur in different parts. Alternatively, two separate identical schedules may be provided—one schedule which is being read and another schedule which is being configured.

This approach has the following advantages:

First, complex rate calculation and schedule calculation algorithms can be implemented in software or on programmable devices on the management card 340, reducing development risk and cost.

Secondly, the hardware required to support the approach is very simple.

Thirdly, the communication channels between the LICs 310, 320 and the management card 340 do not require stringent delay performance since the primitives are not directly synchronised to the cell transmissions across the backplane 330.

Fourthly, the communication channels 342, 344 between the LICs 310, 320 and the management card 340 require less bandwidth than would be the case if the management card were to reconfigure the cross-bar or backplane 330 every cell time.

Fifthly, the behaviour of the switch/router can be modified by changes to the software algorithms running on the management card 340. This has two consequences. Different applications can be supported by the same hardware. For example, the same hardware could support both internet protocol (IP) routing and circuit switching, including asynchronous transfer mode (ATM) and the related synchronous transfer mode (STM). Furthermore, optimisations and refinements to the algorithms can easily be implemented.

Although the preceding discussion has been in terms of terabit routers, the apparatus of the present invention are capable of implementation in a wide variety of switching devices, including switches and routers, and that these devices can be either purely electronic, part electronic/part optical in nature.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A switching arrangement having:
   a cross bar;
   a plurality of ingress means connected to an input side of the cross-bar;
   a plurality of egress means connected to an output side of the cross-bar, each ingress means including an ingress schedule storing means for storing a plurality of transmission queue identities and an ingress scheduler, and each egress means including an egress schedule storing means for storing a plurality of ingress identities and an ingress scheduler;
   a management card coupled to the ingress and egress schedule storing means, which is adapted to transmit configuration primitives to each of the plurality of ingress means and to each of the plurality of egress means, the configuration primitives providing updated entries for the ingress and egress schedule storing means;
   ingress pointer means for referencing one of said stored plurality of transmission queue identities; and
   egress pointer means for referencing one of said stored plurality of ingress identities from which data is to be received to manage the contents of each ingress schedule storing means and each egress schedule storing means;
   whereby at each cell transmit time, a cell transmitted from a referenced transmission queue in the ingress means is received at said egress means from said referenced ingress identity.

2. The apparatus according to claim 1, further comprising for each ingress means a calculating means for calculating cross-bar rates required at each egress means.

3. The apparatus according to claim 2, wherein calculating means calculates said cross-bar rates, calculated according to current traffic load and quality of service required.

4. A method of routing data using a switching arrangement comprising a cross bar, a plurality of ingress means, each including ingress schedule storing means and an ingress scheduler, a plurality of egress means, each including an egress schedule storing means and an ingress scheduler, and a management card, said method comprising:
   a) storing a plurality of transmission queue identities in each ingress schedule storing means;
   b) storing a plurality of ingress identities in each egress schedule storing means;
   c) transmitting configuration primitives from the management card to each of the plurality of ingress means and to each of the plurality of egress means, the configuration primitives providing updates entries for the ingress and egress schedule storing means;
   d) managing contents of each ingress schedule storing means and each egress schedule storing means by providing ingress pointer means to reference one of said stored plurality of transmission queue identities and egress pointer means to reference one of said stored plurality of ingress identities from which data is to be received; and
   at each cell transmit time, the ingress scheduler transmits a cell from a referenced transmission queue in the ingress means and the cell is received at the egress scheduler of said egress means from said referenced ingress identity.

5. A method according to claim 4, wherein step e) further comprises moving said ingress pointer and said egress pointer to a next location.

6. The method according to claim 5, wherein step e) further comprises, when each pointer has reached a last location, moving to a first location.

7. The method according to claim 6, wherein step d) comprises, for each ingress means, calculating cross-bar rates required at each egress means.

8. The method according to claim 7, wherein said cross-bar rates are calculated according to current traffic load and quality of service required.

9. The method according to claim 8, wherein step d) further comprises calculating corresponding ingress and egress schedules which satisfy said calculated cross-bar rates.

10. The method according to claim 9, further comprising the step of updating the ingress and egress schedule storing means with update messages relating to the calculated ingress and egress schedules.

11. A switch, comprising:
   a cross bar;
   a first and second ingress forwarder coupled to the cross bar, wherein the first and second ingress forwarders each include a plurality of data queues, an ingress timetable and a scheduler, wherein the plurality of data queues and ingress timetable are coupled to the scheduler;
   a first and second egress forwarder coupled to the cross bar, wherein the first and second egress forwarders each include an egress timetable and an ingress selector coupled to the egress timetable; and
   a management card coupled to the timetables of each of the first and second ingress and egress forwarders, wherein the management card provides updates to the timetables of each of the first and second ingress and egress forwarders.

12. The switch of claim 11, wherein the ingress timetables identify which of the plurality of data queues is to be accessed at a particular time.

13. The switch of claim 12, wherein the ingress timetables each include a pointer identifying which of the plurality of data queues is to be accessed at the particular time.

14. The switch of claim 11, wherein the egress timetables identify which of the first and second ingress forwarders from which the egress forwarder is to receive a cell at a particular time.

15. The switch of 14, wherein the egress timetables each include a pointer identifying which of the first and second ingress forwarders from which the egress forwarder is to receive a cell at the particular time.

16. The switch according to claim 11, wherein each ingress forwarder calculates cross-bar rates required at each egress forwarder.

17. The apparatus according to claim 16, wherein the cross-bar rates are calculated according to current traffic load and quality of service required.

* * * * *